(12) United States Patent
Fisher

(10) Patent No.: US 10,032,480 B2
(45) Date of Patent: Jul. 24, 2018

(54) MOTION TRACKING SYSTEM

(71) Applicant: Visible Ink Television Ltd, Midlothian (GB)

(72) Inventor: Martin Fisher, Midlothian (GB)

(73) Assignee: Visible Ink Television Ltd., Midlothian (GB)

( * ) Notice: Subject to any disclaimer, the term of this patent is extended or adjusted under 35 U.S.C. 154(b) by 0 days.

(21) Appl. No.: 15/031,900

(22) PCT Filed: Oct. 24, 2014

(86) PCT No.: PCT/EP2014/072920
§ 371 (c)(1),
(2) Date: Apr. 25, 2016

(87) PCT Pub. No.: WO2015/059304
PCT Pub. Date: Apr. 30, 2015

(65) Prior Publication Data
US 2016/0267942 A1   Sep. 15, 2016

(30) Foreign Application Priority Data

Oct. 24, 2013 (GB) .................................. 1318838.8
Dec. 12, 2013 (GB) .................................. 1321981.1

(51) Int. Cl.
*G11B 27/031* (2006.01)
*H04N 5/272* (2006.01)
(Continued)

(52) U.S. Cl.
CPC ............ *G11B 27/031* (2013.01); *G06T 13/80* (2013.01); *H04N 5/262* (2013.01); *H04N 5/272* (2013.01)

(58) Field of Classification Search
CPC ........ G06T 13/80; H04N 5/262; H04N 5/272; G11B 27/031
(Continued)

(56) References Cited

U.S. PATENT DOCUMENTS

2005/0207617 A1* 9/2005 Sarnoff ..................... G01S 5/04
382/103
2015/0297949 A1* 10/2015 Aman ............... G06F 17/30781
348/157

OTHER PUBLICATIONS

Anonymous: "The New ARt of Virtual Moviemaking," Nov. 19, 2011.*

* cited by examiner

*Primary Examiner* — Mishawn Hunter
(74) *Attorney, Agent, or Firm* — Berliner & Associates

(57) ABSTRACT

In a method of producing a composite animation live captured image sequence by capturing a live action sequence of action scenes with an image capture device, which include a stand-in for an animated feature or character, generating concurrently with the live action sequence configuration data for the stand-in, positioning data associated with the stand-in derived through machine vision techniques applied to the live action sequence image frames; producing from the configuration data and the positioning data a computer-generated animated sequence for combining with the captured image sequence to produce composite image sequence comprising the animated feature in place of the stand-in, both the configuration data and frame-by-frame virtual camera data corresponding to the live action image captured frames can be synchronously incorporated enabling efficient and effective production of composite animation live action digital video or film or broadcast. As such, the stand-in tracking data is video-ready such that all animation data may be readily slotted into the captured
(Continued)

video image to produce a composite that achieves the requirement of suspended disbelief.

11 Claims, 5 Drawing Sheets

(51) Int. Cl.
*G06T 13/80* (2011.01)
*H04N 5/262* (2006.01)
(58) Field of Classification Search
USPC .......................................... 386/280; 382/103
See application file for complete search history.

MOTION TRACKING SYSTEM

FIELD OF THE INVENTION

This invention pertains generally to the field of the incorporation of animated footage into live action footage for television and digital video or film production and more particularly the incorporation of an animated character into digital video or film footage include live action characters. The invention relates to a process and system for incorporating animated footage and characters into live action film for television and film production.

BACKGROUND OF THE INVENTION

The incorporation of animated characters and animated footage in television and film production based on initially live action and live action characters is a known technique, primarily used in big budget feature films.

The technique has numerous challenges. First among them is the need to suspend disbelief. This is the process by which the viewer may be willing to accept the presence of an animated character in a live action sequence and critical in achieving this is the balance, appearance and behaviour of the actors in relation to the animated character and the behaviour of the rendered animated character in the final sequence. If the actors do not react appropriately or the character is not properly orientated, the viewer will not treat the sequence as credible.

A known technique for incorporating an animated character in television and primarily film production is to utilise a 'stand-in' for the animated character in the live action filming. This stand-in might be a human actor or may be a remote control vehicle or simply a puppet of some description. In scenes where the animated character is expected to move in some way and where the action is shot from multiple angles using one or more cameras, it is necessary to track the location of the 'stand-in' for the animated character relative to its surroundings so that the animated character can be superimposed into the film in a realistic and believable manner. Where the stand-in is a human or other live actor, whose movements represent the movement of the animated character, the manner of movement of the actor may be recorded and that data used to manipulate movement of the animated character when incorporated into the final sequence during post-filming image production.

Such techniques among others have been used in feature films incorporating live and animated action, such as Who Framed Roger Rabbit, Harry Potter and Lord Of The Rings A particular disadvantage of the known techniques, especially for more complex sequences involving moving animated characters, is that in order to suspend disbelief an extraordinary effort is required to accurately track position and movement of the stand-in in a live action shot with multiple camera angles, to collate and utilise that data in order to realistically superimpose the animated character into the final sequence. This data is required to be used to incorporate the animated character frame-by-frame in typically footage comprising at least 50 frames per second. In the past, for example in the film Who Framed Roger Rabbit, the incorporation of animated character could be achieved by hand, whilst other techniques have been used to install the animated character into the footage. More recently, animation software has been developed for creating the animation although incorporating the animation sequence into live action footage to produce a composite remains a laborious task. In any event, accuracy and completeness of movement and positioning data is required for effective incorporation of animated images.

This complexity and detail makes the incorporation of animated characters and animated footage into live action sequences exorbitantly expensive and thus only the domain of big budget feature films whilst being unachievable for other shows, such as television programmes or returning television series.

Position and movement data is typically recorded using a motion tracking and positioning system. Several have been described and typically use a stand-in, such as a live human actor, in the place of an animated character and often the data is captured in 'grey space', that is without reference to the surroundings. Large amounts of motion and positioning data then need to be correlated with the live action shot during incorporation of the animated character in a further operation.

There is a need for a method and system that enables more effective and efficient production of composite animation live action image recording and/or broadcast.

The present inventor has developed a technique and system that overcomes shortcomings of the prior art.

PROBLEM TO BE SOLVED BY THE INVENTION

There is a need for improvements in apparatus, systems and methods for capturing and producing image recordings and/or broadcasts with the capability of composite animation.

SUMMARY OF THE INVENTION

In accordance with a first aspect of the invention, there is provided a system for use in producing a composite animation live captured image recording and/or broadcast comprising:
a live action image capture device; and
a machine vision object positioning system for providing positioning data associated with a stand-in object in a captured live action scene; and, optionally,
a system for providing configuration and/or movement data associated with the stand-in object.

In a second aspect of the invention, there is provided an apparatus or system for use in producing a composite animation live captured image recording and/or broadcast comprising
a live action image capture device; and
a machine vision object positioning system,
wherein the machine vision object positioning system is configured with the live action image capture device to derive position data of a stand-in within a or each frame captured by the live action image capture device.

In a third aspect of the invention, there is provided a machine vision object positioning system for generating positioning data in relation to one or a plurality of object features in a captured image from a camera, the system comprising one or a plurality of object features for positioning in relation to a stand-in for use in a scene to be captured by the camera and a machine vision object positioning software module configured to position the one or a plurality of object features in an image captured by a camera.

In a fourth aspect of the invention, there is provided a method of producing a composite animation live captured image sequence, the method comprising:
capturing a live action sequence of action scenes with one or a plurality of image capture devices, which action scenes comprise a stand-in for an animated feature, the live action sequence comprising a plurality of sequential time-coded image frames;

generating, concurrently with the live action sequence, capture configuration data and/or movement data associated with configuration and/or movement of the stand-in;

generating positioning data associated with the stand-in as captured in the live action sequence from a plurality of said captured image frames of the live action sequence;

producing, using the configuration data and/or movement data and the positioning data, a computer-generated animation (or animated sequence) for combining with the captured image sequence to produce composite image sequence comprising an animated feature in place of the stand-in; and combining the computer-generated animation with the captured image sequence utilizing at least one of the positioning data and configuration data to locate and configure the animation in each frame of the composite.

In a fifth aspect of the invention, there is provided a computer program product comprising one or more sequences of machine-readable instructions for use in accordance with the method above, the instructions being configured to cause at least one processor to produce, using the configuration data and/or movement data and the positioning data, a computer-generated animation (or animated sequence) for combining with the captured image sequence to produce composite image sequence comprising an animated feature in place of the stand-in.

In a sixth aspect of the invention, there is provided a computer program product comprising one or more sequences of machine-readable instructions for use in accordance with the method above, the instructions being configured to cause at least one processor to combine the computer-generated animation with the captured image sequence utilizing at least one of the positioning data and configuration data to locate and configure the animation in each frame of the composite.

In a seventh aspect of the invention, there is provided a computer program product comprising one or more sequences of machine-readable instructions for use in producing a composite animation live captured image sequence from a live action sequence of action scenes, the live action sequence captured with one or a plurality of image capture devices, which action scenes comprises a stand-in for an animated feature, the live action sequence comprising a plurality of sequential time-coded image frames, the instructions being configured to:

cause at least one processor to generate, concurrently with the live action sequence, capture configuration data and/or movement data associated with configuration and/or movement of the stand-in;

cause at least one processor to generate positioning data associated with the stand-in as captured in the live action sequence from a plurality of said captured image frames of the live action sequence;

cause at least one processor to produce, using the configuration data and/or movement data and the positioning data, a computer-generated animation (or animated sequence) for combining with the captured image sequence to produce composite image sequence comprising an animated feature in place of the stand-in; and cause at least one processor to combine the computer-generated animation with the captured image sequence utilizing at least one of the positioning data and configuration data to locate and configure the animation in each frame of the composite.

In an eighth aspect of the invention, there is provided a system for producing a composite animation live captured image sequence, the system comprising:

one or a plurality of image capture devices operable to capture a live action sequence of action scenes with which action scenes comprises a stand-in for an animated feature, the live action sequence comprising a plurality of sequential time-coded image frames;

at least one processor configured to:

generate, concurrently with the live action sequence, capture configuration data and/or movement data associated with configuration and/or movement of the stand-in;

generate positioning data associated with the stand-in as captured in the live action sequence from a plurality of said captured image frames of the live action sequence;

produce, using the configuration data and/or movement data and the positioning data, a computer-generated animation (or animated sequence) for combining with the captured image sequence to produce composite image sequence comprising an animated feature in place of the stand-in; and combine the computer-generated animation with the captured image sequence utilizing at least one of the positioning data and configuration data to locate and configure the animation in each frame of the composite.

In a ninth aspect of the invention, there is provided a stand-in or harness for a stand-in comprising a plurality of nodes for capturing orientation and/or movement data and a plurality of machine vision object identifiers.

In a tenth aspect of the invention, there is provided a software system, or plurality of inter-engageable software modules, comprising one or any combination of two or more of the following:

a machine vision object positioning software module configured to position the one or a plurality of object features in an image captured by a digital video camera;

an operational data software module configured for capturing and storing in at least a time-coded or frame-tagged form camera operational data specific to each captured live-action image frame;

a software module configured to collate and time-code configuration and/or orientation data associated with one or a plurality of node sensors for use on a stand-in a software module configured to receive or access an animation feature arranged to be configured or orientated according to a set of stand-in node sensor data and configured to apply time-coded configuration and/or orientation data associated with one or a plurality of node sensors for use on a stand in to the animation feature to produce a time-coded configured animation feature a software module configured to receive or access a configured animation feature time-coded or tagged to a particular composite frame, to accord machine vision determined positioning data to the animated feature to produce a position-accorded configured animation feature time-coded to a particular composite frame;

a software module configured to receive or access a configured animation feature time-coded or tagged to a particular composite frame, to accord time-coded or frame-tagged camera operational data to that animation feature and to adapt the configured animation feature to achieve a visual equivalence effect on the animation feature for consistency with the camera operation data;

a software module configured to receive a position-accorded configured animation feature time-coded to a particular composite frame, optionally adapted and tagged with operational data, and to dispose the animated feature into a composite frame comprising a correspondingly time-coded live-action captured image to produce a live-action animated feature composite image frame and to store said time-coded composite image frame.

In an eleventh aspect of the invention, there is provided a software system, optionally comprising one or more software modules, which software system is configured to:
  receive a configured animation feature time-coded for a particular composite frame;
  accord machine-vision determined positioning data to the animated feature;
  optionally accord operational data to the configured animated feature; and
  dispose the animated feature into a composite frame comprising a correspondingly time-coded live-action captured image.

In an twelfth aspect of the invention, there is provided a software module for generating positioning data from a live-action captured image, the software module configured to carry out the steps of:
  image recognition to identify in the capture image any one or a plurality of pre-determined object features to be associated with pre-determined nodes on an animated feature, each object feature provided with a plurality of elements;
  subject the identified object features to a series of pre-determined algorithms to determine certain data from elements of the object features
  subject said data to a projected transformation process to produce a projected transformation matrix from which position data may be accorded to a corresponding node on an animated feature.

In a thirteenth aspect of the invention, there is provided an object feature for use in a system as defined above.

In a fourteenth aspect of the invention, there is provided a composite animated live-action image obtained by the above method and/or software system.

In an fifteenth aspect of the invention, there is provided a method of creating a television production, the method comprising scripting and designing a scene for capture on digital video and audio; setting-up a scene for shooting; providing one or a plurality of cameras, the cameras being configured to transmit the captured images and image data to one or more microprocessors configured to receive such images and image data; designing and creating an animated feature for appearing in the television or video film production and configuring the animated feature for configuration and orientation and positioning according to data to be provided; providing a stand-in comprising one or a plurality of node sensors for capturing configuration and orientation data associated with the stand-in and configured for digital communication with a microprocessor; shooting the scene to capture a sequence of live action captured image frames and subjecting the sequence of image frames to a method and/or software system as defined above; and undertaking any post-production steps to produce a live-action composite television production.

ADVANTAGES OF THE INVENTION

The apparatus and system of the present invention enable efficient and effective production of composite animation live action digital video or film or broadcast by producing stand-in object position and optionally movement data and optionally other information that is completely synchronous with the captured live action image shots making up the digital video. As such, the stand-in tracking data is video-ready such that all animation data may be readily slotted into the captured video image to produce a composite that achieves the requirement of suspended disbelief.

DETAILED DESCRIPTION OF THE INVENTION

Figure 1:
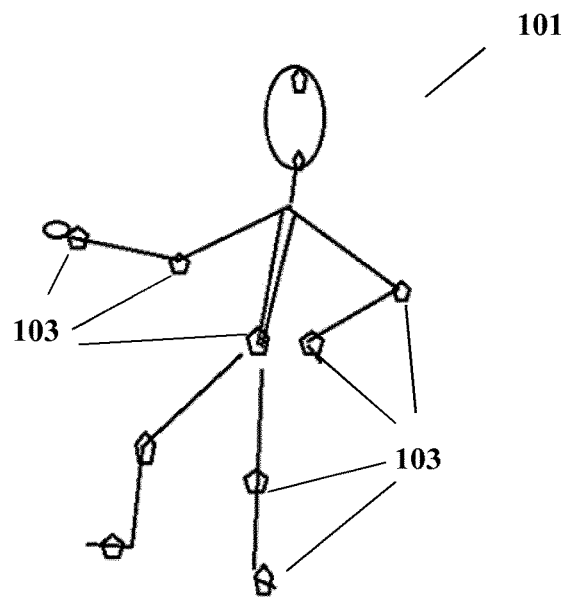
FIG. 1 shows an illustration of a stand-in (stick man representation) including a representation of a harness or suit according to one aspect of the invention.

The system according to the present invention for use in producing a composite animation live captured image recording and/or broadcast comprises a live action image capture device, a machine vision object positioning system for providing positioning data associated with a stand-in object in a captured live action scene, and preferably also a system for providing configuration and/or movement data associated with the stand-in object.

A composite animation live captured image is typically a digital composite image produced from a live captured image (a frame) having superimposed thereon an animation feature configured for that frame.

Thus the system of the invention preferably provides at least two sets of data relating to aspects of the stand-in location, shape, configuration and movement in a scene and in a captured image frame. The sets of data are sourced synchronously with the image capture and may be time-coded or tagged for correspondence with individual frames of captured images making up the image sequence capturing an act or scene. Thus, a sequence of image frames may be produced with synchronous positioning data and/or configuration data and/or movement data (or corresponding source data) and used to configure and dispose an animation feature into the image frame to form a composite image frame by applying the positioning data and/or configuration data to the animation feature.

Thereby a realistic and accurate composite animated live action image sequence can be very rapidly produced.

An animation feature may be a cartoon or digitally generated character or other image that is digitally generated. It should typically be capable of movement in terms of configuration and position. The animation feature should be configured to adopt certain configurations according to configuration data that can be generated (e.g. captured by a system of the present invention) and accorded to the animation feature. The animated feature or character is typically intended to replace the stand-in in the composite image.

Other data may also be produced or sourced synchronously with live action image capture. Other data may be, for example, operational data and audio data. Audio data is simply the capture of sound and speech live from the scene by microphones as the image of the scene is captured by a camera. Such audio data may be streamed for storage for replay or broadcast synchronously with the corresponding image frame sequence. Operational data is typically comprises of camera specific data concerning the operation and features of each camera and will typically include focal settings and resolution data. Preferably, operational data is sourced synchronously with live action image capture and time-coded or tagged to a corresponding image frame. This may be used to improve the suspension of disbelief desired when incorporating an animation feature into a live action captured image. For example, if a certain depth of field is achieved by the image capture device (camera) and the position and orientation of the animation feature for composition with that frame has a degree of depth, the animation feature may be manipulated using such data so that the focal configuration of various portions or nodes of the animation feature are consistent with their immediate surroundings.

The system preferably generates positioning data and configuration and/or movement data. The positioning data is preferably generated from the machine vision object positioning system and is preferably generated from the perspective of one or more (e.g. each) image capture device. The configuration data is preferably generated or captured independently from the image capture device but synchronously with image capture.

Positioning data and/or configuration data may be generated or produced in relation to a stand-in object or in particular in connection with object features, which may have pre-determined or readily identifiable characteristics.

Hereinafter, positioning and configuration data may be referred to as relating to a stand-in or an object feature associated with a stand-in or a node associated with a stand-in, which terms may be considered to be interchangeable where the context allows.

Positioning data can typically be provided for two purposes. Firstly, positioning data is provided in relation to the stand-in generally, which relies on the position of the stand-in in a particular frame of reference. This may be referred to as stand-in positioning data or primary positioning data and preferably the purpose of this positioning data is to inform or drive a 'virtual camera' in a animation package so that the view of the animation feature, in terms of position and orientation of the animation relative the stand-in, matches that in the actual captured image frame from the image capture device. Secondly, positioning data may be provided in relation to one or more other object features associated with the stand in and more particular associated with a node associated with the stand-in (which node may also be the location of configuration data independently generated). This second source of positioning date, which may be referred to as node data may serve at least two purposes. It may provide secondary positioning data for the 'virtual camera' associated with the stand-in position and orientation such as to monitor or correct the primary data and/or it may be used to check, monitor and/or correct configuration data, by way of correcting drift, which is discussed later.

Positioning data as used herein is any position data which can position a stand-in and thus an animated feature in a captured image frame. Typically, positioning data may comprise one or more of location data and orientation data. Location data comprises typically two-dimensional coordinate (e.g. x and y coordinates, or vertical and horizontal coordinates) data which can locate an object feature in a captured image frame. Preferably, location data may further comprise depth data (or z-coordinate) whereby the object feature can be positioned within the scene captured by the image capture device from the perspective of the image capture device. Orientation data may comprise in-plane orientation data and out-of-plane orientation data. In-plane orientation data relates to the directionality of the object feature within the plane of the captured image (or image frame), e.g. about 360 degrees about an axis perpendicular to the plane of the captured image. To enable full determination of in-plane orientation data, at least some degree of asymmetry of the object feature is required and preferably, multiple dimensions of asymmetry. Out-of-plane orientation data preferably comprises at least two components, which can be defined as twist (about a vertical axis) or tilt (about a horizontal axis). Thus the position in a captured scene may be defined by the two-dimensional position (within a captured image frame), the depth (distance from the camera), rotation (about an axis perpendicular to the plane), twist relative the direction of shot and the tilt relative the direction of shot from the image capture device (e.g. camera).

Configuration data as used herein is any data relating to the shape, configuration, location and/or movement of the stand-in or object feature associated with the stand-in, which data is preferably obtained independently of the image capture device (and other than from the perspective of the image captured device).

Various apparatus may preferably be used as parts of the system or associated components and themselves represent further aspects of invention.

A composite animation live action image recording/broadcast as used herein is a sequence of production images comprising a live action sequence having an animation sequence imposed thereon to create a composite recording or sequence.

An image capture device as used herein is any device suitable for capturing image sequences. It is typically a camera such as a movie camera and more typically a digital movie camera (usually being a professional digital movie camera).

In a preferred embodiment, the live action image capture device and machine vision object positioning system are co-located or co-configured and more preferably the machine vision object positioning system utilizes the live action image capture device or image sequence feed therefrom or image capture data as its source of data. By co-located, it is meant that the machine vision object positioning system utilizes images captured by a device co-located with the image capture device, which includes, optionally the image capture device itself in which case the machine vision system is co-configured with the image capture device and uses data derived from the live action image sequence captured with the image capture device. The machine vision system preferably comprises software or a software module loaded onto a suitably programmed computer configured to receive an image feed which comprises an object feature.

A machine vision object positioning system (according to a further aspect of the invention) may comprise any suitable arrangement whereby the stand-in object positioning data may be determined. The machine vision object positioning system may comprise or utilize a hardware element or may use the digital image feed from a hardware element. The machine vision object positioning system may be configured to generate positioning data for a stand-in object or one or more object features associated with the stand-in. In particular, in one embodiment, the machine vision object positioning system may generate measured positioning data (e.g. from a hardware element). The hardware element may be a time-of-flight imaging device co-located with the camera, or may be a device configured for attachment to the stand-in and an image capture device for measuring actual position of a stand-in relative the image capture device (e.g. by GPS, or by triangulation).

In a preferred embodiment, the machine vision object positioning system may generate determined (or calculated) positioning data from an image feed from an image capture device comprising frames having a pre-determined or scaled object feature.

Thus, in a second aspect of the invention, there is provided an apparatus or system for use in producing a composite animation live captured image recording and/or broadcast comprising
   a live action image capture device; and
   a machine vision object positioning system, wherein the machine vision object positioning system is configured with the live action image capture device to derive position data of a stand-in within a or each frame captured by the live action image capture device.

A stand-in or object feature may be identified using data from image capture device as an object for which three-dimensional position data is required. This identification may be achieved using shape recognition methodologies and software.

Preferably, the machine vision object positioning system comprises, or utilizes data from, an image capture device, which is preferably the live action image capture device used to capture the scene and from which the final product is created (rather than a separate hardware element such as a time-of-flight camera). According to this embodiment, the machine vision object positioning system may comprise machine vision object positioning software (or a software module) configured to utilize digitally captured image data from the live action image capture device and determine therefrom positioning data of one or more pre-determined object features which may be associated with the stand-in object. For example, the object features may be disposed in association with the stand-in object.

The software preferably comprises an image recognition component, for identifying the one or more object features provided in a shot and a feature processing component for deriving from the object feature location data (e.g. two dimensional location data and depth data) and object feature orientation data.

Since positioning data may be determined from the captured images, this can be determined and tagged to the respective frame or image (or time-logged to correspond with a respective frame or image). The image processing required to determine object positioning data from the captured images can be done immediately after capture, or at any time downstream prior to or during composite production, since the required data is always present in the original images and may remain until, for example, production processing, e.g. when producing a composite or pre-processed image.

The object positioning image processing may be carried out on any frequency of frames (captured images). For example, the object positioning data may be determined for every frame or every second frame or every fifth frame or every tenth frame or every fiftieth frame or any other desired frequency. Preferably, the object positioning image processing is carried out to produce positioning data at a frequency of the frame rate. Alternatively, object positioning data generating rate may be determined dependent upon other factors. For example, high frequency determination of a two dimensional position in a frame may be determined and depth and orientation data may be determined at a frequency that depends upon the speed of two dimensional movement of the object in a scene.

Object features for use to determine positioning data associated with a stand-in may be any suitable object feature which is capable of being recognized by image or shape recognition software of a software module and having pre-determined or scaled parameters associated therewith whereby certain positioning data can be determined from the capture of the object feature in an image frame.

The object feature may be, for example, an array of LEDs or a 2D (or 3D) pattern (e.g. a printed pattern). Preferably the array or pattern has horizontal components and vertical components (although not necessarily specific horizontal lines and vertical lines). By providing a pattern with pre-determined or scaled shapes, objects or distances provided thereon, the positioning software may be able to determine the distance of the object feature from the camera thus providing scene-location object depth data.

A live action captured sequence may include one or more stand-ins. Thus the or each object features associated with each stand-in should be distinguishable from those of each other stand-in.

Preferably, a plurality of object features are provided at various positions (and various sides) of the stand-in in order to produce a plurality of sets of positioning data, associated with each of the object features. The object features should therefore be distinguishable from one another.

A machine vision object positioning software module (or program for a computer) is preferably provided as a component of the machine vision object positioning system and as a further aspect of the present invention. The machine vision object positioning software module should be configured to receive captured image frames (or data therefrom) produced by and communicated from an image capture device such as a camera. The software module is configured to provide an image recognition step for identifying one or more object features (e.g. a printed pattern) associated with a stand-in in a frame and a positioning data processing step for determining from the object feature and parameters associated therewith certain components of positioning data. The software module preferably allocates the positioning data a time-code or tags the dataset to the captured image frame from which it is derived and tags the dataset to a particular object feature identified. Optionally, post processing steps are provided by the software module to smooth out the data and remove data irregularities.

A system is thus provided wherein the machine vision object positioning system comprises computer software configured to determine from digitally captured image data from the live action image capture device the position and/or orientation of one or more pre-determined features disposed in association with the stand-in.

Preferably, the or each object feature (or a plurality of object features together) provide a plurality of points in the scene for which an image is captured, which points preferably comprise rotation and translation in the x, y and z axes. Ideally 6 or more and more preferably 9 or more points or parameters are provided.

The data associated with each object feature may be subject to a projected transformation process to produce a projected transformation matrix. This matrix (and the process) may be carried out in accordance with known methods in the art, such as those published by Olivier Faugeras and Andrew Zisserman and Richard Hartley (e.g. "Multiple View Geometry in Computer Vision", $2^{nd}$ edition, R Hartley and A Zisserman, Cambridge University Press, 2004).

Preferably the projected transformation process, preferably being at least an element of the positioning data processing step mentioned above, utilizes in addition to specific data derived from the image operational data (as defined above) associated with the image capture device (camera). Preferably, the object features and the operational data provide 9 or more parameters or point to feed the projected transformation process.

One or a plurality of object features may be primary object features, which may be primarily selected to provide a frame of reference for primary positioning data concerned primarily with positioning the stand-in within the captured image frame for the purpose of driving a 'virtual camera' in a corresponding animated frame (e.g. in an animation software).

The, some or all object features are preferably disposed or for disposal at nodes of the stand-in.

A system for providing configuration and/or movement data associated with the stand-in object is also preferred according to the system of the invention. This system (which may be considered a configuration data-generation system) should be capable of generating configuration data, which as mentioned above is any data relating to the shape, configuration, location and/or movement of the stand-in or object feature associated with the stand-in and which data is preferably obtained independently of the image capture device.

Thus, the configuration data-generation system may be a system as is known in the prior art, such as in U.S. Pat. No. 5,990,908 or U.S. Pat. No. 6,050,962.

Preferably the configuration data-generation system comprises a base station (e.g. computer or microprocessor) in signal communication with one or a plurality of sensors disposed or disposable in relation to a stand-in, the sensors configured to sense or capture configuration-related data. The one or a plurality of sensors may be disposed or disposable at nodes, being key positions on the stand-in for which configuration and/or movement data may be useful in the subsequent incorporation of an animated sequence to produce the composite. Nodes are typically locations on the stand-in that are associated with movement or relative movement and are typically on the limbs of any object or joints of a stand-in object and include core and peripheral nodes.

The sensors (or node sensors) may comprise sensing capability selected from one or more of acceleration sensing, tilt sensing, rotation sensing shock sensing, vibration sensing, position sensing (e.g. global positioning system, triangulation positioning, RF positioning or other position sensing) and body joint angles (e.g. using potentiometer linked metal or plastic rods or strips).

Preferably, a sensor may comprise, for example, one or more of an accelerometer, a gyrometer and a magnetometer and more preferably an accelerometer, a gyrometer and a magnetometer. Optionally, the sensor may comprise a MEMS inertial sensor, which may comprise one or more of the sensing capabilities referred to above.

Configuration data associated with a node may be directly determined by measurement of some parameter capable of being sensed by the sensor or determined by relative relationship of a parameter at one node with a parameter at another node. The configuration data may be compiled from data from the sensors (sensor data) which is communicated by way of signals to the base station. The configuration data may be compiled at the base station or further communicated for compilation and/or processing.

Signal communication to a base station may be by means of wired signal communication (e.g. from a plurality of sensors on a stand-in to a base station hosted by the stand-in), but is preferably by wireless communication from each node-sensor to a remote base station, e.g. by Wi-Fi™, Blutooth™ or more preferably RF signal communication.

Configuration data may be compiled at a frequency of, typically, up to the frequency of image capture of the image capture device. For example, the sensor signal data may be communicated and configuration data may be compiled at a frequency corresponding to the frames per second of the camera, or every second frame, every fifth frame, every tenth frame, etc. Preferably, the configuration data is compiled at at least the frame rate used, e.g. at least 2× the frame rate, or at least 3× the frame rate, or at least 5× the frame rate. The frequency of configuration data capture may be arranged to vary according to the amount of movement data expected or identified in any image capture sequence or portion thereof. Preferably, the configuration data is captured and compiled per frame captured, which is typically at least 50 frames per second. The configuration data is preferably time-coded and may then correlated with or be tagged to a corresponding image frame captured by the image capture device.

Preferably a node comprises a node-sensor and an object feature, whereby for the particular node both positioning data and configuration data may be produced at the same or different frequencies.

Preferably, multiple nodes are provided for use in association with a stand-in. Each node should preferably be separately identifiable by the machine vision object positioning system and the configuration data generation system (e.g. by a unique identifier). Thus, multiple sets of positioning data and configuration data may be generated, each associated with a particular node at a predetermined or variable frequency. Each set of data is time-coded for correlation with or tagged to a captured image frame. Thus, synchronous data relating to positioning and configuration of each node may be provide tagged to or correlated with each captured image frame for which data has been generated. The synchronicity of data enables animated features to be disposed into composite frames based on the captured image frames using the synchronous positioning and configuration data applicable to corresponding nodes on the animated feature, thereby enabling a composite animation live action sequence to be produced at a fraction of the processing effort and time (and cost) of traditional and existing methods.

Alternatively, or additionally, configuration and/or movement data (obtained independently from positioning data) can be derived from any other suitable source of motion capture, such through optical or magnetic means, for example.

Configuration data, which is captured independently from the image capture device may be correlated with captured image frames from any number of synchronously operated image capture devices. Positioning data from the machine vision system is particular to the image capture device from which the data is generated (and from which perspective the data applies) and so multiple sets of positioning data may be generated, one for each image capture device in synchronous operation.

According to another aspect of the invention, there is provide a motion capture harness or suit having one or a plurality of object features as defined above (e.g. individually identifiable by a machine vision system), preferably located at nodes, and, optionally, one or a plurality of sensors (for use with a configuration data-generation system as defined above), preferably provided located at nodes.

The object features and sensors are preferably co-located at nodes on the harness or suit.

As mentioned above, there is further provided a method of producing a composite image live captured image sequence, which comprises capturing a live action image sequence of an action scene with one or a plurality of image capture devices which action scene comprises a stand-in for an animated character; producing a computer-generated animated feature (or sequence) for combining with the captured image sequence to produce a composite sequence; providing the stand-in with a plurality of object features as defined above and, optionally, a plurality of sensors (as defined above), identifying the object features in the captured image sequence and determining therefrom certain positioning data associated with the stand in and correlating or tagging said data to the respective captured image frame; and producing a composite image sequence by applying the positioning data associated with the stand-in to the produced animated feature and disposing the animated feature in the composite image frame in place of the stand-in.

Preferably the step of identifying the object features is carried out under instruction by a software (program for a computer) for providing image recognition and preferably the step determining position data is carried out by a software (computer program) step, which together preferably are comprised in a machine vision object positioning software module, such as that described herein.

Preferably the step of producing the animated feature and the step of produce the composite image sequence using the image captured sequence and the animated feature data is carried out using suitable software such as commercially available software developed or commercialized for that purpose (an example of which is Motion Builder™)

Stand-in associated data, including positioning data and configuration data (including movement and orientation data) are directly associated with the live image-capture camera and thus the camera image (the positioning data is typically particular to a specific camera image, whilst the configuration data is relevant to any camera image and indeed independent of any camera image).

This is a significant improvement on existing motion-tracker systems which produce 'data' and no other production picture component. The prior art data is recorded in neutral 'grey' space and the animation to fit this data has to be placed into the production picture component by hand, which means coordinating (or marrying) somehow the stand-in position and orientation data that is to apply to the animated character with the features and elements of a live video image. This is a time consuming and laborious process that is done by hand to varying degrees, often a 'by-hand' process assisted by sophisticated software. The present invention essentially 'pre-marries' the stand-in position data, with both the orientation data that is to apply to the animated character with the features and elements of a live video image. Thus the production steps are significantly reduced. The positioning data and configuration data and live action images are captured in real-time (and may be tagged or referenced to one another) along with sound recording, optionally, and importantly, the positioning data may be produced from the perspective of the captured live action image (as they are captured by the live action image capture device). This makes the data produced directly in context with the live action shot and the other actors and set features and avoids complex, data-heavy and production-team demanding manipulations.

Configuration data derived from node sensors such as MEMS inertial nodes are known to produce good and reliable 'pose' information (or configuration and orientation data) for applying to an animated feature. However, when used for positioning, these configured animation features disposed in a composite image are prone to drift, whereby the determining position tends to move away from the actual position. It is thus preferable to have both positioning data and configuration data, whereby the configuration data is primarily used for configuring the pose of the animation feature in a composite image, whilst the positioning data is utilized to correct any positioning element of the configuration data or to apply to the animation feature to ensure it is disposed in a correct position within a composite frame, There is also provided, as a further aspect of the invention a use of captured image data from a device such as a conventional camera to position an object feature associated with a stand-in in a scene captured in an image frame containing the object feature.

As discussed above, to implement the processing of the invention, there is preferably provided a software system, or plurality of inter-engageable software modules, comprising one or any combination of two or more of the following:

- a machine vision object positioning software module configured to position the one or a plurality of object features in an image captured by a digital video camera;
- an operational data software module configured for capturing and storing in at least a time-coded or frame-tagged form camera operational data specific to each captured live-action image frame;
- a software module configured to collate and time-code configuration and/or orientation data associated with one or a plurality of node sensors for use on a stand-in
- a software module configured to receive or access an animation feature arranged to be configured or orientated according to a set of stand-in node sensor data and configured to apply time-coded configuration and/or orientation data associated with one or a plurality of node sensors for use on a stand in to the animation feature to produce a time-coded configured animation feature
- a software module configured to receive or access a configured animation feature time-coded or tagged to a particular composite frame, to accord machine vision determined positioning data to the animated feature to produce a position-accorded configured animation feature time-coded to a particular composite frame;
- a software module configured to receive or access a configured animation feature time-coded or tagged to a particular composite frame, to accord time-coded or frame-tagged camera operational data to that animation feature and to adapt the configured animation feature to achieve a visual equivalence effect on the animation feature for consistency with the camera operation data;
- a software module configured to receive a position-accorded configured animation feature time-coded to a particular composite frame, optionally adapted and tagged with operational data, and to dispose the animated feature into a composite frame comprising a correspondingly time-coded live-action captured image to produce a live-action animated feature composite image frame and to store said time-coded composite image frame.

Preferably, all of the software modules are provided.

Preferably, there is provided a software system, optionally comprising one or more software modules, which software system is configured to:
 receive a configured animation feature time-coded for a particular composite frame;
 accord machine-vision determined positioning data to the animated feature;
 optionally accord operational data to the configured animated feature; and
 dispose the animated feature into a composite frame comprising a correspondingly time-coded live-action captured image.

In one embodiment, there is provided a software module for generating positioning data from a live-action captured image, the software module configured to carry out the steps of:
 image recognition to identify in the capture image any one or a plurality of pre-determined object features to be associated with pre-determined nodes on an animated feature, each object feature provided with a plurality of elements;
 subject the identified object features to a series of pre-determined algorithms to determine certain data from elements of the object features
 subject said data to a projected transformation process to produce a projected transformation matrix from which position data may be accorded to a corresponding node on an animated feature.

There is further provided a composite animation live action sequence software system comprises a source of live action captured image frames comprising a stand-in with associated positioning data and, optionally, configuration data, a source of animated feature data, preferably configured to correlated with nodes for which positioning data and configuration data is supplied and image composition software for applying the positioning data and configuration data to the animated feature and disposing it in a composite image frame based on the corresponding captured image frame in which the stand-in is substituted by the animated feature.

One or more processors may be provided, e.g. in each module or platform, for performing the above processes.

A particularly preferred embodiment implementing one or more aspects of the invention are now described followed by a number of alternative applications of the technology.

According to a preferred embodiment, the system and method of the present invention are concerned with the production of a composite animated, live captured sequence typically for use for television or film comprising live action and an animated feature, typically an animated character. The animated feature will be intended to replace a stand-in in the live action captured scene, which typically will involve actors and a stand-in for the animated feature, which may be an actor in a suitable harness or suit having configuration data capture functionality and a machine recognition feature. More than one stand-in may be in the live action captured scene representing more than one animated feature, each of which is typically subject to its own data set.

Typically, each stand in has a target object feature which is uniquely identifiable to that stand-in (e.g. when there is more than one stand-in in a captured image sequence). That target object feature may be a primary target object feature intended to provide primary positioning data for the stand-in (i.e. position in a captured image frame and orientation in that frame, whereby the camera angle changing or the stand-in turning can be allowed for). Whilst one or more primary target object features can be utilized, there should preferably and most simply be a single object feature or machine recognizable pattern which is used to determine primary positioning data (which could optionally be checked/modified by other object feature position data associated with the stand-in).

The primary positioning data provides the necessary data for a 'virtual camera' in an animation software. The view of the animated feature or character in an animation software for any particular frame can be said to be provided by a virtual camera. The primary position data can be provided to a virtual camera ideally in combination with operation data from the actual camera, so that all the necessary data to position and ideally focus an animated feature in a frame can be provided.

The configuration data provided by the system (typically by node-mounted sensors as described above) provide details as to the configuration of the stand-in in each frame which can be applied to the animated feature/character in each frame synchronously with the positioning data.

Typically, the animation software will have an animated feature or character created which has a range of movements and body shapes created for it and defined which can correspond with a range of movements for the stand-in. Its particular configuration simply depends on the configuration data for the stand-in (e.g. an actor wearing a harness/suit with a plurality of nodes). The configuration system provides configuration data to be applied to the animated feature on a frame-by-frame basis, typically (or in a frequency to be determined). Thus, for each frame, a configuration (e.g. shape/pose) of the animated feature is provided using the configuration data from the stand-in.

The synchronous primary positioning data defines the virtual camera angle and positioning of the animated feature within the frame (the virtual frame of the virtual camera) which thus corresponds with the actual captured frame and thus exactly with the camera angle and positioning of the stand-in in the actual captured image frame from the camera. Thus, the configuration of the animated character is provided and the angle of view and positioning within the frame (for the virtual camera) for the animated character in that configuration for each particular frame is provided. Accordingly, all the information required for incorporating the animated character into a composite live action image frame is available and the animated character may simply be 'dropped-in' to the composite image frame with little or no post-production effort.

Where there is more than one stand-in, each representing an animated feature or character, the positioning and configuration data for each may be used to generate an animated sequence for each in which each animated sequence has a virtual camera driven by the primary positioning data and an animated feature pose according to the configuration data thereby generating multiple sequences of frame superimposable with the live action captured sequence of frames so as to generate a composite live action image sequence with a plurality of independently acting animated features.

The positioning data which may be associated with each node can be used periodically to 'correct; the configuration data. Accelerometers are somewhat prone to 'drift' and the machine vision generated positioning data from the captured image frame can be used to check and correct accuracy of identified configuration data and to 'recalibrate'. Optionally, the frequency of checking, correcting and recalibrating can be pre-determined or may be set to depend upon the speed of movement of the nodes of the stand-in (since degree of drift will be easier to perceive with greater movement), which speed of movement can be determined from the node data.

A number of alternative and particular applications of this technology are contemplated.

In one application, an anatomical study composite animation live action captured imaging system and method is provided. This has application in animal and human health. References to methods associated with particular animals below should be understood to be optionally applicable to other animals or human bodies.

For example, in an equine study system, an animated anatomical model of a horse may be developed. This may define a full range of movements of a horse. It may optionally have layers or disaggregatable layers of visualization, such as muscle system, organs, bones or composites thereof. A horse which is suitably harnessed with multiple nodes for generating configuration data associated with particular locations the animated anatomy and with a source for machine-vision derived positioning data may act as the stand-in in a live action captured image sequence of the horse (e.g. with a rider during performance, work or training) By superimposing by the system above the or parts of the animated anatomical feature, the internal physical effects of the activity may be observable, e.g. by a vet. This, could thus be used to perfect performance, identify injury or for early identification of potential health problems. Optionally, data can be provided to enable a fully animated version of the horse to be disposed, from the animation package, in order to rotate the view etc.

In another example, the system may assist in telemedicine applications. For example, an animated anatomical model of a patient may be provided in a location of a medical professional such as a specialist consultant whilst a patient in a remote location is captured, wearing a suitable harness, using a camera (e.g. a mobile phone camera). Thus, the patient, or parts of the patient, may represent the stand-in in the above system. The consultant may be able to view for example certain movements of the patient in association with a superimposed animation to diagnose condition or monitor improvement or treatment without the need for physical examination.

Another application of the invention is in the use of real situation crash test performance evaluation. By providing a fully functional animation of a car, for example, which may have different layers or skins (skin, frame, components) as is common in CAD and engineering software and fitting the car with a plurality of configuration data-generating nodes, the car may act as a stand-in for the functional animation feature. Thus, real-life visualisations of the performance of the car and its components can be provided by filming (capturing a sequence of) the car in a crash scenario (not normally tested for), such as crashing into a tree or three car collision which could be conducted on a race track (or by observing real-life performance at a busy junction) By providing the composite animation live action sequence using the present invention, performance characteristics of various aspects of the car (the frame, the skin, suspension, airbags etc) can be assessed and visualized in more realistic crash test situations.

The methods, systems and software of the present invention and aspects thereof, as described above, enable high quality images and image sequences, including the animation generation and the composition steps, which perform to high production values. Such composite animation live captured image sequences may thus be produced to high definition television production standards. Preferably, the image capture, animation production and composition steps and the standard of positioning and configuration data are such that the resultant composite image sequences perform to high production standards and, in particular, meet High Definition television production standards.

The invention will now be described in more detail, without limitation, with reference to the accompanying Figures.

According to FIG. 1, a stand-in actor 101 is provided with a harness configured multiple nodes 103 positioned at key motion tracking locations about the body. Each node 103 comprises an object feature that is a shape or pattern identifiable by image recognition software and each object feature being independently recognisable (in this case the object feature is represented by a range of pentagon shapes). The object feature should be a pattern such as to enable depth to be determined as well as some degree of twist and/or tilt. Thus a set of positioning data should be capable of being generated by each node that is in shot in each frame of an image sequence captured by a television camera. Typically, one node, or a further machine recognisable pattern such as an arrangement of three nodes in typically consistent relative positions to one another, may be defined as a primary object feature in order to derive primary positioning data. Each node 103 should also be provided with a sensor, such as a MEMS inertial motion capture device (e.g. having an accelerometer, gyrometer and magnetometer), which may be for example an Xsens MVN inertial motion capture device (see www.xsens.com). Thus, for each node 103, a set of configuration data relating to orientation data of the stand in 101 and relative movement of the nodes 103 may be generated. These may be captured at any desired frequency and time-coded to correlate with the image captured by the television or the digital video film camera.

Figure 2:
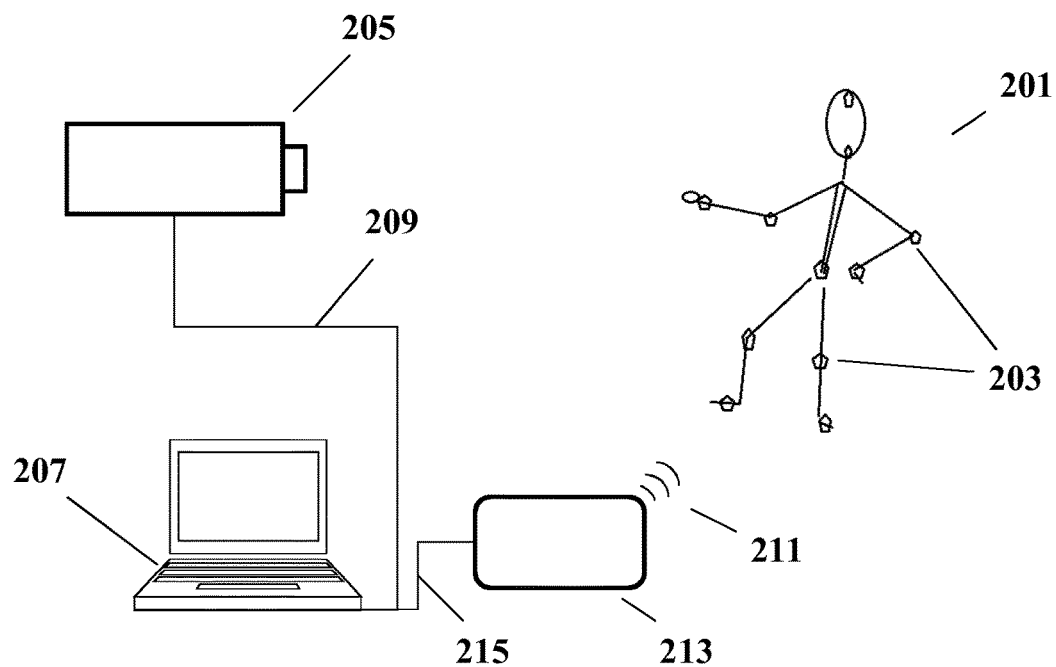
FIG. 2 shows an illustration of the system of the present invention comprising a single camera and a stand-in wearing a harness or suit of FIG. 1.

As illustrated in FIG. 2, a composite animation live action image sequence system utilises a stand-in 201 having a plurality of nodes 203, each (as in FIG. 1) having an image-recognisable object feature (such as a static pattern or LED) and a sensor, such as a MEMS inertia sensor. A live action sequence is captured from the scene containing the stand-in by television camera 205, which communicates the sequence of captured image frames to production computer 207 (loaded with a machine vision positioning data software module) by cable 209. The sensors of nodes 203 communicate configuration data by wireless signal 211 to base station 213 where data is compiled (e.g. time-coded) and communicated by cable 215 to production computer 207.

Figure 3:
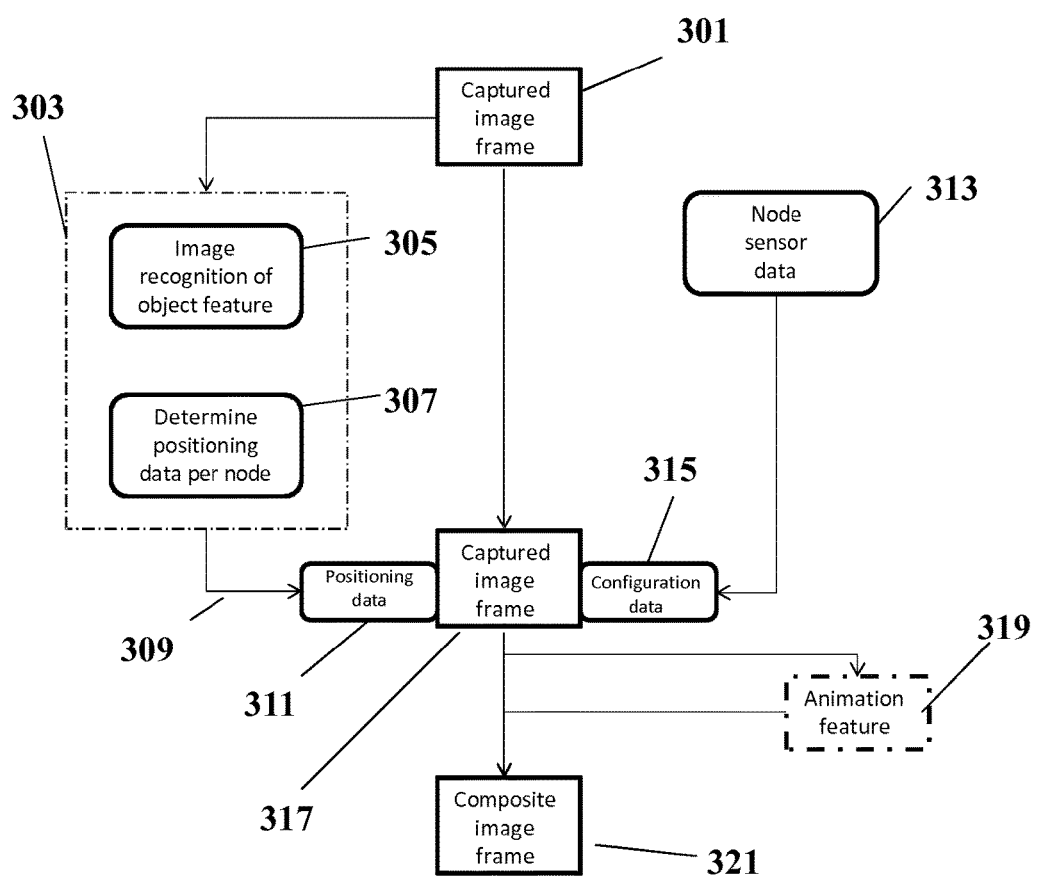
FIG. 3 illustrates the process steps in a method of producing a composite image sequence according to the present invention.

The process by which the system of the invention (e.g. in FIG. 2) operates is illustrated in FIG. 3. According to FIG. 3, an image frame is first captured 301, e.g. by camera 205, and communicated to production computer 207 loaded with a machine vision software module 303 which first carries out an image recognition step 305 to identify the one or more object features provided on the nodes 203 of a stand-in 201 captured in the image frame 301. The object features are then subjected to a process step 307 to determine positioning data associated with each node 203 or object feature. Primary positioning data may also be generated associated with a primary object feature. An output 309 of the machine imaging software module 303 is a set of positioning data 311 for each node 203 captured in the image frame 301 including primary positioning data for the stand-in as a whole (for the purpose of driving a virtual camera in an animation generation platform), which data may be tagged to the respective image frame (providing extrinsic parameters) and provided to the production computer. Operational data from the camera 205 associated with each captured frame and tagged to the respective frame, to provide intrinsic parameters (such as focal length, pixel pitch and 2-D coordinate system of the camera), are provided to the production computer. Sensors positioned at the nodes 203 communicate node sensor data to a base station and the compiled data is communicated to a production computer as is illustrated in FIG. 2. The node sensor data 313 which comprises data for each node 203 on the stand-in 201 is time-coded and is then tagged to 315 or correlated with the correspondingly time-coded image frame. Positioning data for each node may then be correlated with the configuration data for each node to produced correlated position and configuration data 312 for each identified node per image frame. The position and/or configuration data and/or operation data tagged to a particular frame may then be processed by software on the production computer to produce a projected transformation matrix 314. The tagged image frame 317 and/or corresponding positioning data 311 and/or configuration data 315 for the tagged frame 317 and/or the projected transformation matrix is provided for use with an animation feature 319 such as an animated character (configured and developed by an animation software module such as Motion Builder™) and used to position, shape and configure the character for incorporation into the live action image frame 317 and then the composite image frame 321 is formed having the animated feature 319 disposed in place of the stand-in 201. Primary positioning data for the stand-in may be used to primarily position the character in the frames of a virtual camera of the animation software module, which position may be moderated or modified by other node-specific positioning data. Sound may be synchronously captured and fed directly to the post-production processing system (not illustrated).

Figure 4:
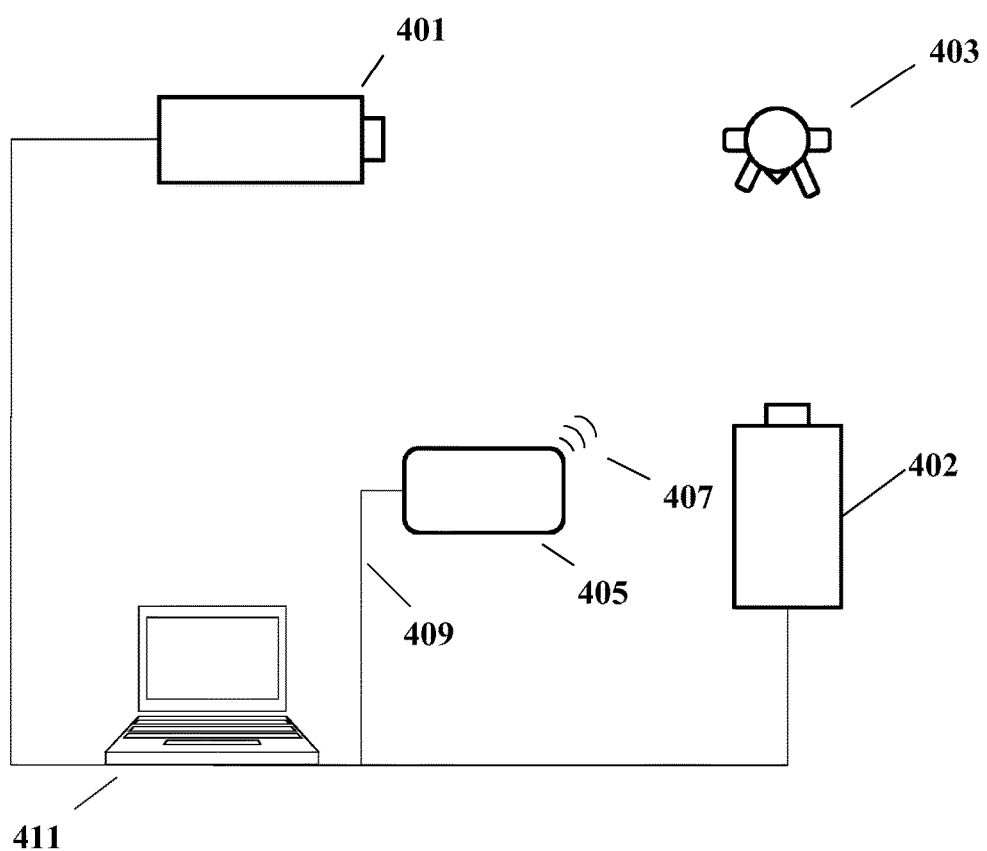
FIG. 4 shows an illustration (in partial plan view) of the system of the present invention comprising multiple cameras and a stand-in wearing a harness or suit of FIG. 1.

In FIG. 4, a system is illustrated in which multiple cameras 401, 402 are used to capture images that include a stand-in 403. As with FIG. 2, a base station 405 is provided to receive configuration data from the node sensors on the stand-in 403 via wireless signal 407. This configuration data is then communicated by cable 409 to production computer 411 where it is correlated with any captured image frames having the same time-code. Cameras 401 and 402 produce captured image frames of the scene and the stand-in 403 which are communicated to the production computer 411 which is loaded with a machine image processing software module, which operates on each sequence of captured images from each camera 401, 402 to identify object features and then to determine positioning data. An individual set of positioning data will be associated with each node in each frame produced by each camera. Configuration data from the node sensors will be associated with each frame but independently from the camera. Thus, a captured image frame from cameras 401 and 402 respectively will each have an independent set of machine imaging determined positioning data for the object features but will each have tagged or correlated thereto a common set of configuration data arising from the node sensors.

Thus, as shots are selected and the animated feature incorporated into the composite sequence being produced, positioning and configuration data for the selected shot will synchronously be available for manipulating and incorporating the animated feature into each frame.

Figure 5:
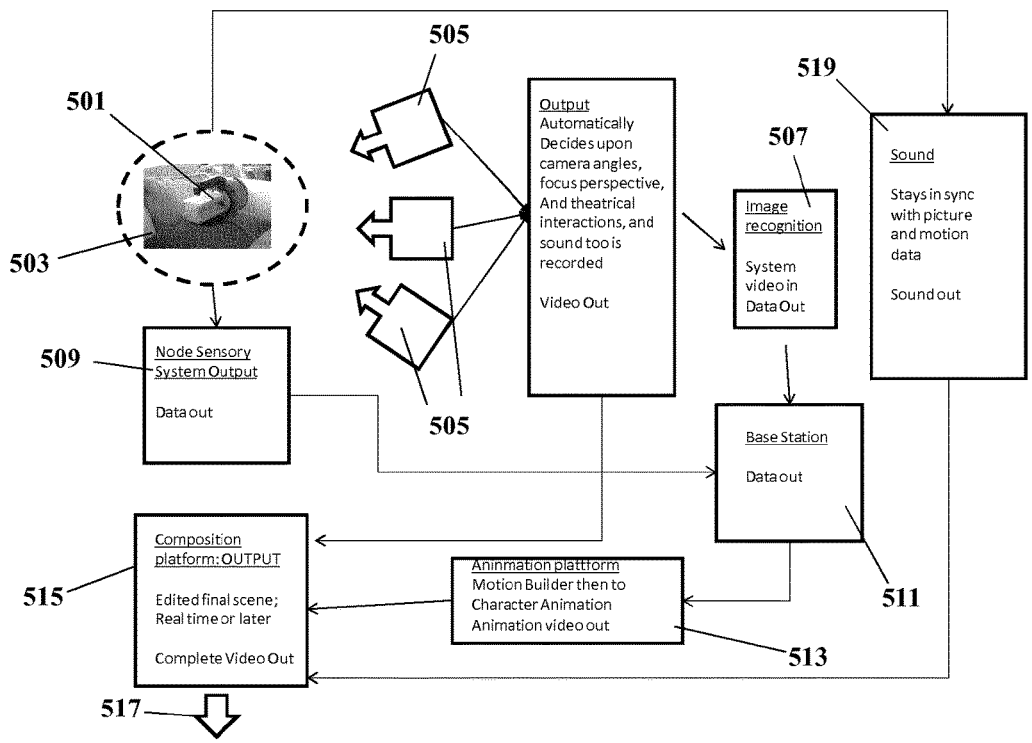
FIG. 5 illustrates the process, components and inter-relationship and steps to output.

FIG. 5 illustrates the interaction of process steps and components in a whole multi-camera setup. According to FIG. 5, an action scene 501 including a stand-in 503 is captured by multiple cameras 505, which feed image capture data and operational data tagged to each frame to a processor. Multiple parallel sequences may be provided for later directional editing or directions may be provided for capture of a scene by any particular camera at any particular time. Thus operational data and camera data may be provided to a microprocessor configured with production editing software. Simultaneous sound capture is achieved, by one or more microphones on set, or by any live studio voiceover microphones, and streamed concurrently with the captured images to the microprocessor. A machine vision software module 507 (e.g. a software module loaded on a production computer) is provided with captured image sequence which is subjected to image recognition processing to identify one or more object features associated with the stand-in and with nodes on the stand-in. The machine vision module 507 may then determine therefrom certain positioning data associated with the stand-in and the nodes. This is fed, along with configuration data captured by the nodes sensory system output 509 and wirelessly communicated with a base station 511 (which may be a production computer), to an animation platform 513 comprising an animation software (e.g. Motion Builder™). The animation platform 513 may utilise the positioning and configuration data and the camera operational data, and/or a projected transformation matrix generated therefrom to produce an animation sequence in time-logged form ready for disposing into the live image captured sequence in a composition platform 515 for real-time or subsequent editing, storage or video output 517 of a composite animated live action image sequence. Sound is captured synchronously 519 and fed to composition platform 515.

One or more processors may be provided in each of the modules/platforms 509, 507, 513, 515 or alternatively the processing may be performed by one stand-alone processor or a plurality of distributed processors.

Figure 6:
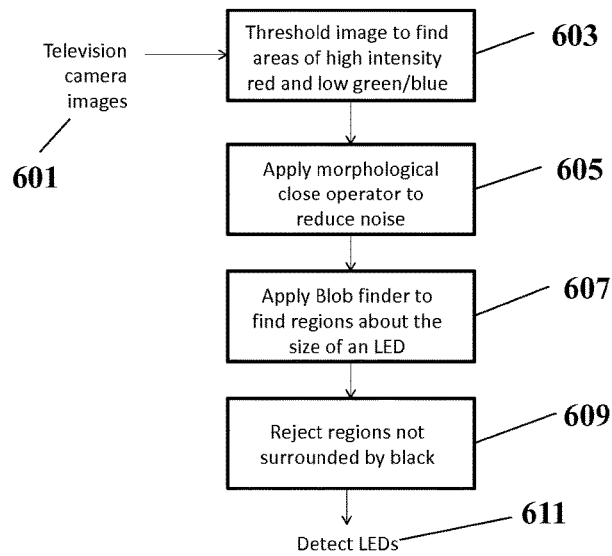
FIG. 6 illustrates a process of image recognition by a machine vision system in one embodiment.

FIG. 6 illustrates a process of image recognition by a machine vision system in one embodiment in which LEDs were used as the object features. According to this process, captured image frames 601 are fed to a microprocessor having an image recognition software module configured to identify red LEDs and first a threshold image process 603 identifies high intensity red and low green/blue areas in the captured image, a morphological close operator 605 is applied to reduce noise, a blob finder 607 identifies regions in the size range of the LEDs, deselect step 609 removes those regions not surrounded by black (since the stand-in harness in this case is a black suit fitted with red LEDs) and identified LED locations are provided 611.

Figure 7:
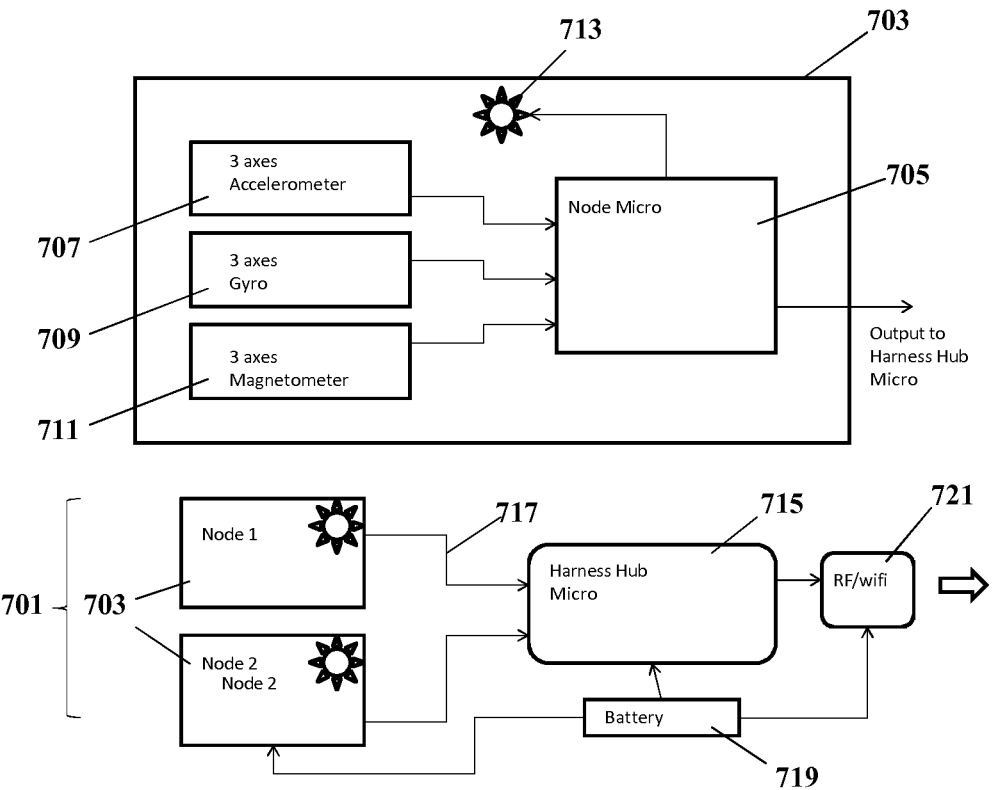
FIG. 7 illustrates the components of a node sensor arrangement for use in accordance with an embodiment of the invention.

FIG. 7 illustrates the components of a node sensor arrangement 701 and a node sensor 703 according to one embodiment. Node sensor 703 comprises a node microprocessor 705 which operates a 3-axes accelerometer component 707, a 3-axes gyro component 709 and a 3 axes magnetometer component 711. It also operates an LED 713. Data from the components 703, 707, 709 is output to a harness hub 715 which receives communication from multiple node sensors 703 by bus connections 717, which hub 715 is provided with a battery 719 for powering the hub 717 and node sensors 703 as well as LED 713 and wireless device 721.

Figure 8:
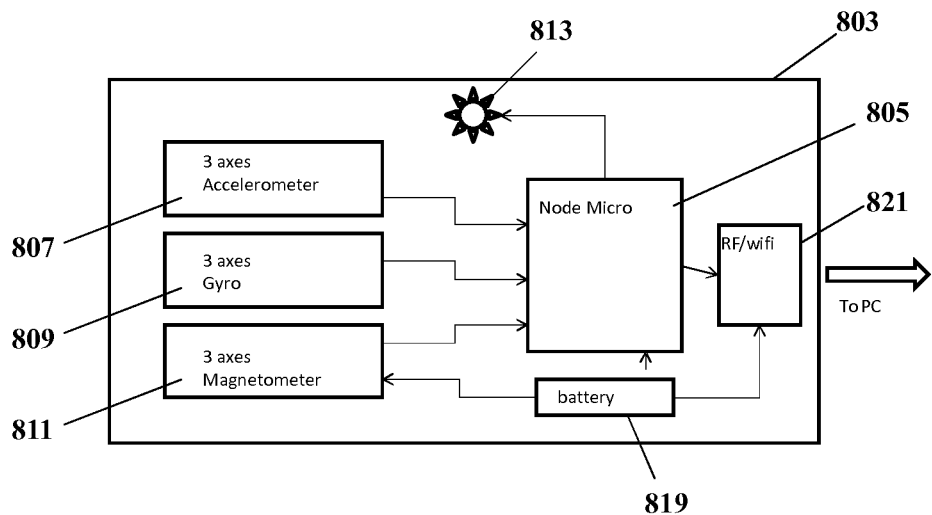
FIG. 8 illustrates an alternative node sensor arrangement for use in accordance with an embodiment of the invention.

An alternative configuration of a node sensor 801 is shown in FIG. 8. This comprises a node microprocessor 805 which operates a 3-axes accelerometer component 807, a 3-axes gyro component 809 and a 3 axes magnetometer component 811. It also operates an LED 813. It is provided with a battery 819 for powering the sensor 801 as well as LED 813 and on-board wireless device 821 for output to a PC.

The invention has been described with reference to a preferred embodiment. However, it will be appreciated that variations and modifications can be effected by a person of ordinary skill in the art without departing from the scope of the invention.

The invention claimed is:

1. A system for producing a composite animation live captured image sequence, the system comprising:
    one or a plurality of image capture devices operable to capture a live action sequence of action scenes with which action scenes comprises a stand-in for an animated feature, the live action sequence comprising a plurality of sequential time-coded image frames;
    a machine vision object positioning system for providing positioning data associated with a stand-in object in a captured live action scene,
    wherein the positioning data is tagged to or synchronous with image data captured by the one or the plurality of image capture devices, and
    wherein the machine vision object positioning system is configured to determine from digitally captured image data from the live action image capture device positioning data of one or more pre-determined object features disposed in association with the stand-in;
    a separate system for providing configuration data and/or movement data associated with the stand-in object,
    wherein the configuration data and/or movement data is/are tagged to or synchronous with image data captured by the one or the plurality of image capture devices; and
    at least one processor loaded with software, said processor in data-communication with the machine vision object positioning system and the separate system, and configured together with the machine vision object positioning system and the separate system to:
        generate, concurrently with the live action sequence, capture configuration data and/or movement data associated with configuration and/or movement of the stand-in;
        generate positioning data associated with the stand-in as captured in the live action sequence from a plurality of said captured image frames of the live action sequence;
        produce, using the configuration data and/or movement data and the positioning data, a computer-generated animation (or animated sequence) for combining with the captured image sequence to produce composite image sequence comprising an animated feature in place of the stand-in; and
        combine the computer-generated animation with the captured image sequence utilizing at least one of the positioning data and configuration data to locate and configure the animation in each frame of the composite.

2. A system according to claim 1 for use in producing a composite animation live captured image recording and/or broadcast.

3. A system as claimed in claim 1, wherein the position data comprises location data and/or orientation data.

4. A system as claimed in claim 3, wherein the location data comprises two-dimensional frame coordinate data and/or depth data.

5. A system as claimed in claim 3, wherein the orientation data comprises a twist component and a tilt component.

6. A system according to claim 1, wherein each object feature is selected from an arrangement of LEDs or a static pattern.

7. A system according to claim 1, wherein image capture device operational data is generated and tagged to or synchronous with image data captured by the image capture device.

8. A system according to claim 1, wherein the system for providing configuration data of the stand-in object comprises an arrangement of sensors disposed at nodes about the stand-in which sensors are configured for data communication with the base station.

9. A system according to claim 8, wherein each node comprises an inertia motion capture sensor.

10. A system according to claim 1, wherein the configuration data is time-coded according to its time of creation.

11. A system according to claim 1, which further comprises a microprocessor and/or data storage apparatus for processing and/or storage of data, wherein positioning data and/or configuration data, image capture data and captured images may be communicated to the microprocessor and/or data storage apparatus.

* * * * *